United States Patent
Smouse et al.

(10) Patent No.: US 9,171,648 B2
(45) Date of Patent: Oct. 27, 2015

(54) METHOD OF REPLACING SHROUD OF BOILING WATER NUCLEAR REACTOR, AND ASSOCIATED APPARATUS

(75) Inventors: Jeffrey A. Smouse, Sarver, PA (US); Arto Suoniemi, Ransta (SE); Robert Nolgren, Vasteras (SE); Hans Kornfeldt, Vasteras (SE); Stephen Parker, Fremont, CA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 843 days.

(21) Appl. No.: 13/299,824

(22) Filed: Nov. 18, 2011

(65) Prior Publication Data
US 2013/0125363 A1 May 23, 2013

(51) Int. Cl.
B23P 6/00 (2006.01)
G21C 19/20 (2006.01)

(52) U.S. Cl.
CPC . *G21C 19/20* (2013.01); *B23P 6/00* (2013.01); *G21C 19/207* (2013.01); *Y10T 29/4973* (2015.01); *Y10T 29/51* (2015.01)

(58) Field of Classification Search
USPC .................................................. 976/DIG. 22
See application file for complete search history.

(56) References Cited

U.S. PATENT DOCUMENTS

| | | | | |
|---|---|---|---|---|
| 5,265,141 A | * | 11/1993 | Kobsa | 376/446 |
| 5,392,322 A | * | 2/1995 | Whitling et al. | 376/260 |
| 5,402,570 A | * | 4/1995 | Weems et al. | 29/890.031 |
| 5,519,744 A | * | 5/1996 | Relf | 376/287 |
| 5,530,219 A | * | 6/1996 | Offer et al. | 219/137 R |
| 5,583,899 A | * | 12/1996 | Relf | 376/287 |
| 5,600,690 A | * | 2/1997 | Weems et al. | 376/302 |
| 5,802,129 A | * | 9/1998 | Deaver et al. | 376/287 |
| 5,828,713 A | | 10/1998 | Schmidt et al. | |
| 5,995,574 A | * | 11/1999 | Matsumoto et al. | 376/287 |
| 6,021,170 A | * | 2/2000 | Reimer et al. | 376/261 |
| 6,091,791 A | * | 7/2000 | Matsumoto et al. | 376/287 |
| 6,169,776 B1 | | 1/2001 | Collins | |

OTHER PUBLICATIONS

International Search Report for PCT/US2012/065463 dated Jul. 16, 2013 (Form PCT/ISA/210).
Written Opinion of the International Searching Authority or PCT/US2012/065463 dated Jul. 16, 2013 (Form PCT/ISA/237).
International Preliminary Report on Patentability dated May 30, 2014 for PCT/US12/65463 (Forms PCT/IB/373, PCT/ISA/237).

\* cited by examiner

*Primary Examiner* — Jacob Cigna
(74) *Attorney, Agent, or Firm* — Richard J. Coldren; Westinghouse Electric Company LLC

(57) ABSTRACT

An improved method of replacing at least a portion of a shroud apparatus of a BWR includes forming a cut in the shroud and removing at least a portion of the shroud apparatus that is adjacent the cut from a remaining portion of the shroud apparatus. The method also includes positioning a replacement shroud system adjacent the remaining portion of the original shroud apparatus and connecting a plurality of removable fastening devices between the new replacement shroud system and the remaining portion of the original shroud apparatus. The replacement shroud system thus can, in the future, be readily replaced by detaching the removable fastening devices, removing the replacement shroud system, and installing a new replacement shroud system with less effort than was required in cutting through the original shroud and replacing it with the replacement shroud system. An improved replacement shroud system is also disclosed.

2 Claims, 7 Drawing Sheets

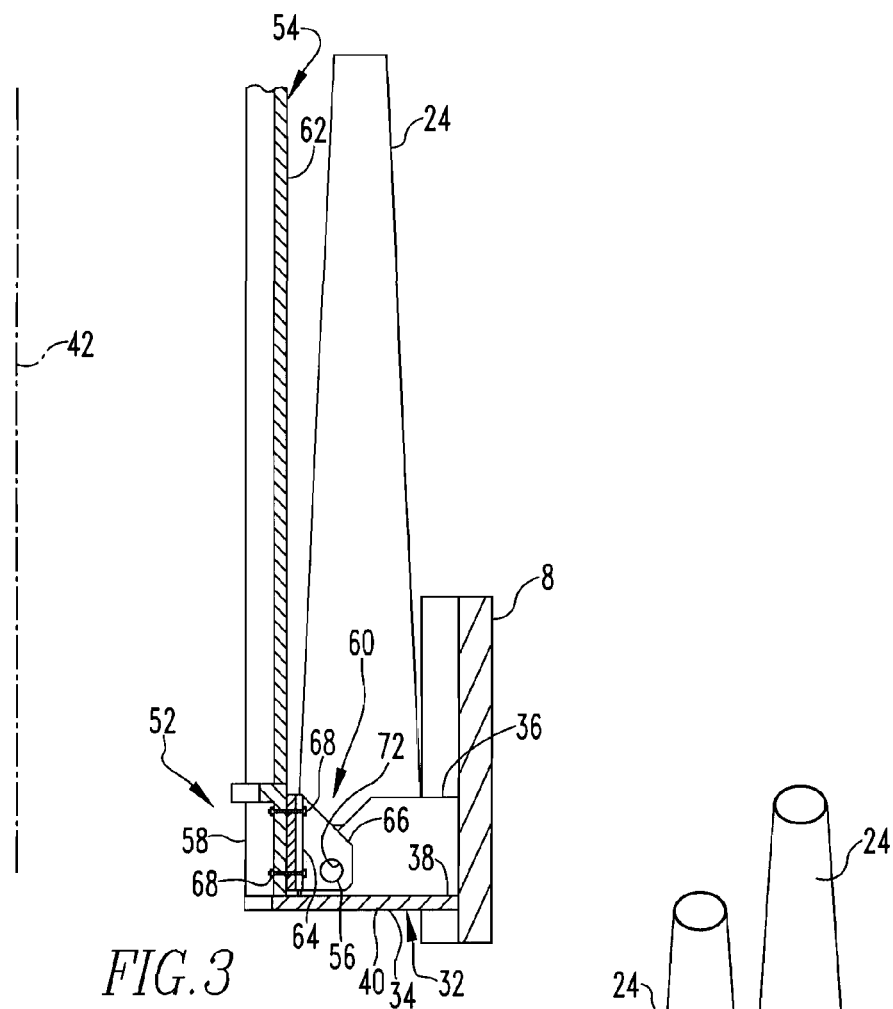
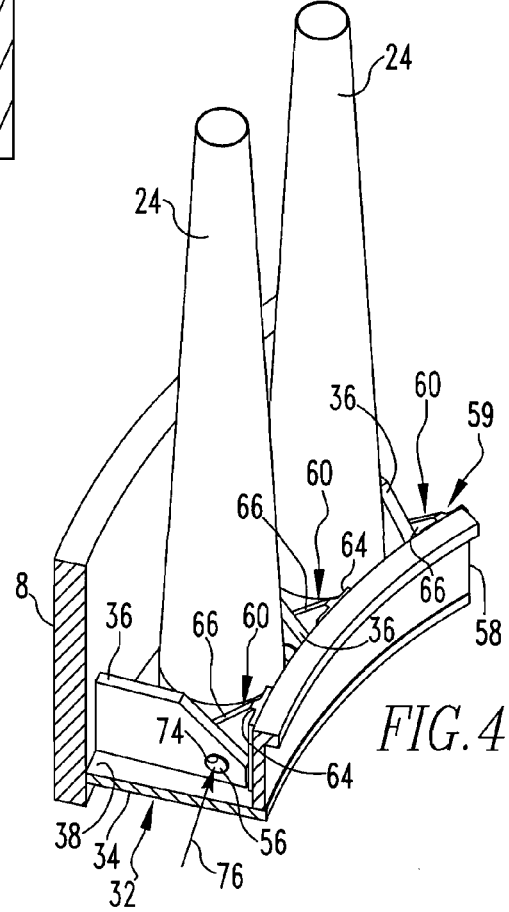

METHOD OF REPLACING SHROUD OF BOILING WATER NUCLEAR REACTOR, AND ASSOCIATED APPARATUS

BACKGROUND

1. Field

The disclosed and claimed concept relates generally to nuclear power plants and, more particularly, to a method of replacing at least a portion of a shroud employed in a boiling water nuclear reactor, and to an associated apparatus.

2. Description of Related Art

As is generally understood in the relevant art, a boiling water reactor (BWR) is a nuclear device which generates steam for the operation of a steam turbine that typically operates another device such as an electrical generator. A BWR typically includes a reactor pressure vessel (RPV) within which is disposed the BWR. The BWR typically includes a plurality of fuel assemblies that are surrounded by a shroud. The shroud is of a hollow and roughly cylindrical shape and is supported on a shroud support plate within the RPV. The shroud is configured to retain coolant around the fuel assemblies in order to cause the heat generated by the fuel assemblies to be converted into steam via evaporation of the coolant. A set of jet pumps typically keep the coolant in a state of motion and agitation in order to promote heat transfer from the fuel assemblies into the water to form steam.

While BWRs have been generally effective for their intended purposes, they have not been without limitation. For example, it has been observed that as the hot operating time of a BWR increases, cracking has been observed in the shroud. Over time, such cracking within the welds used in forming the shroud and elsewhere have become sufficiently extensive to require replacement of the shroud. However, such shrouds typically have been assembled by welding their components together and by welding the shroud to the shroud support plate and possibly to other components. As such, replacement of a welded shroud has been difficult. It thus would be desirable to provide an improved method of responding to the cracking that has become known to occur over time in the shrouds of BWRs.

SUMMARY

Accordingly, an improved method of replacing at least a portion of a shroud apparatus of a BWR includes forming a cut in the shroud and removing at least a portion of the shroud apparatus that is adjacent the cut from a remaining portion of the shroud apparatus. The method also includes positioning a replacement shroud system adjacent the remaining portion of the original shroud apparatus and connecting a plurality of removable fastening devices between the new replacement shroud system and the remaining portion of the original shroud apparatus. The replacement shroud system thus can, in the future, be readily replaced by detaching the removable fastening devices, removing the replacement shroud system, and installing a new replacement shroud system with less effort than was required in cutting through the original shroud and replacing it with the replacement shroud system.

Accordingly, an aspect of the disclosed and claimed concept is to provide an improved method of replacing at least a portion of a shroud apparatus of a BWR.

Another aspect of the disclosed and claimed concept is to provide an improved method of repairing a BWR by replacing an original portion of a shroud that has been welded in place with a mechanically fastened replacement shroud system which can itself be readily replaced.

Another aspect of the disclosed and claimed concept is to provide an improved boiling water reactor assembly that employs a replacement shroud system as set forth in the preceding paragraphs.

Accordingly, an aspect of the disclosed and claimed concept is to provide an improved method of replacing at least a portion of a shroud apparatus that extends adjacent at least a portion of a nuclear reactor. The shroud apparatus includes a roughly cylindrical shroud and a substantially annular support upon which the shroud is disposed. The method can be generally stated as including forming a cut in the shroud, removing at least a portion of the shroud adjacent the cut from a remaining portion of the shroud apparatus, positioning a replacement shroud system adjacent the remaining portion, and connecting each of a plurality of fastening devices between the replacement shroud system and the remaining portion.

BRIEF DESCRIPTION OF THE DRAWINGS

A further understanding of the disclosed and claimed concept can be gained from the following Description when read in conjunction with the accompanying drawings in which:

FIGS. 3 and 4 depict an improved replacement shroud system in accordance with a first embodiment of the disclosed and claimed concept installed on a remaining portion of a shroud apparatus of the boiling water reactor assembly of FIG. 1;

Similar numerals refer to similar parts through the specification.

DESCRIPTION OF THE PREFERRED EMBODIMENT

Figure 1:
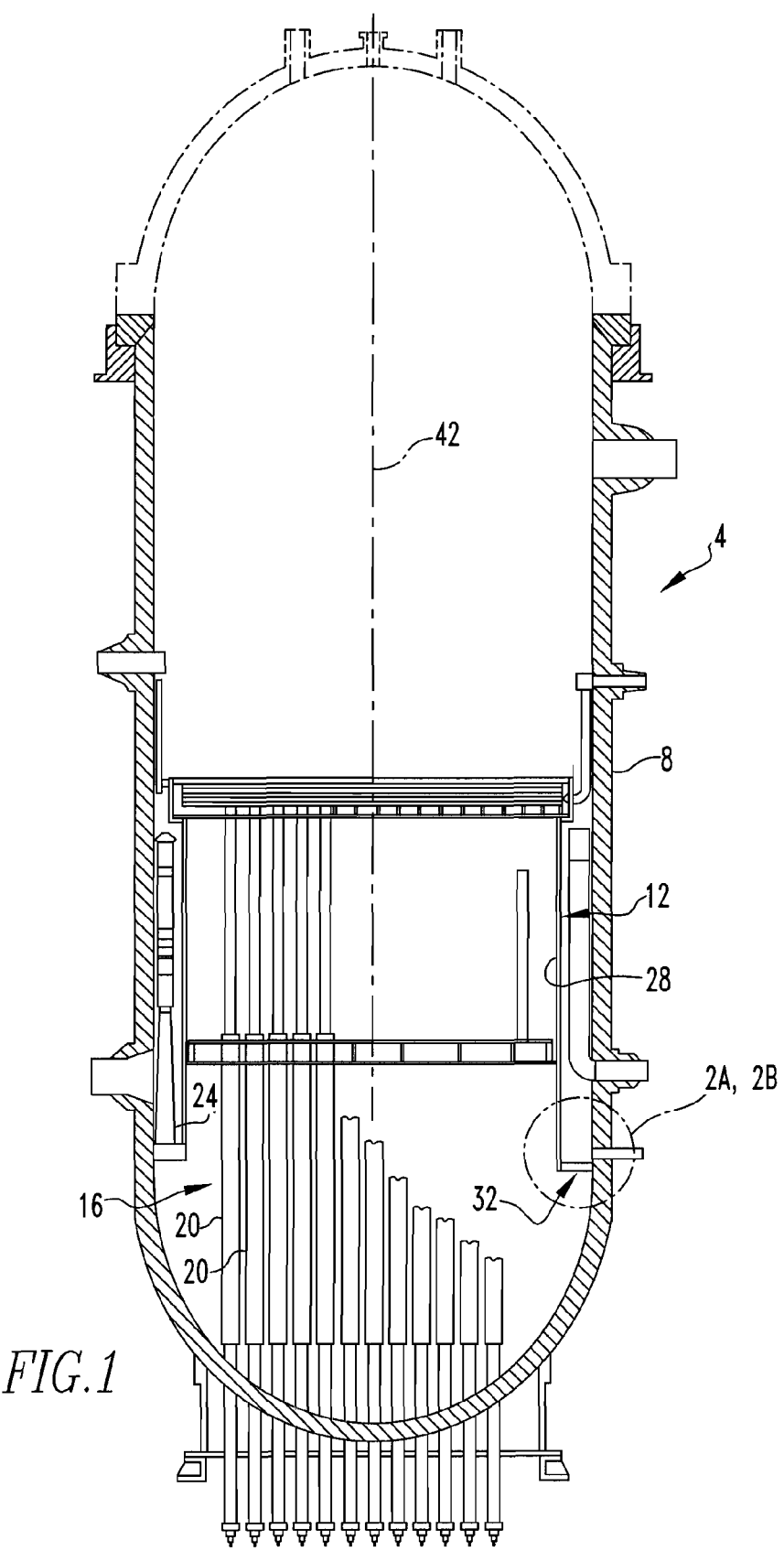
FIG. 1 is a schematic depiction of a portion of a boiling water reactor assembly that is partially disassembled in accordance with the method described herein and which has a shroud apparatus of which at least a portion will be replaced in accordance with the improved method set forth herein.

FIG. 1 depicts a boiling water reactor assembly 4 that is in need of repair in accordance with a method that is set forth herein. Particularly, the boiling water reactor assembly 4 includes a reactor pressure vessel 8 within which is disposed a shroud apparatus 12 and a boiling water nuclear reactor 16. Boiling water nuclear reactor 16 includes a plurality of fuel assemblies 20 and a plurality of jet pumps 24. The shroud apparatus 12 can be said to extend about and to generally contain the fuel assemblies 20 whereas the jet pumps 24 are disposed at an opposite side of the shroud apparatus 12 from the fuel assemblies 20.

As is generally understood in the art, the shroud apparatus 12 retains a liquid coolant around the fuel assemblies 20. During operation of the boiling water nuclear reactor 16, heat from the fuel assemblies 20 is transferred to the coolant and creates steam which is employed to operate a steam turbine which, in turn, operates another device such as an electrical generator. The jet pumps 24 agitate the coolant within the shroud and keep it in a state of motion in order to promote heat transfer between the fuel assemblies 20 and the coolant, which promotes the production of steam. While the coolant is also disposed between the reactor pressure vessel 8 and the shroud 28, it is noted that the shroud 28 retains the agitated coolant in proximity to the fuel assemblies 20 and promotes the movement of steam in an upward direction from the perspective of FIG. 1.

The shroud apparatus 12 includes shroud 28 that is situated on a support 32. The shroud is itself of a hollow and roughly cylindrical shape that is typically formed from numerous plates of stainless steel or other appropriate material that are welded together. The support 32 is of a substantially annular shape and is affixed to an interior surface of the reactor pressure vessel 8. The support 32 is typically welded to the inner surface of the reactor pressure vessel 8. The shroud 8 is situated on top of (from the perspective of FIG. 1) the support 32 and is affixed thereto, typically by welding.

The boiling water reactor assembly 4 is depicted in FIG. 1 as having been in operation for a sufficient period of time that shroud 28 has begun to experience cracking at the welds thereof. The cracking is of sufficient magnitude that shroud 28, or at least a portion thereof, is in need of replacement. Boiling water reactor assembly 8 is therefore depicted in FIG. 1 as being in a condition partially disassembled for the purpose of replacing at least a portion of the shroud 28.

That is, the boiling water reactor assembly 4 of FIG. 1 is depicted as being partially disassembled pursuant to operations that will include replacement of at least a portion of its shroud 28. In particular, the reactor pressure vessel 8 is shown with its upper portion in broken lines depicting its removal. Also removed from the boiling water reactor assembly 8 are structures that include, among other structures, the shroud head cover and the steam dryers, both of which are well understood in the relevant art. Thus, once it has been determined that at least a portion of the shroud 28 is in need of replacement, the boiling water reactor assembly 4 is at least partially disassembled by removing components such as the aforementioned steam dryers, shroud cover head, and piping that may affect the removal of the shroud 28 (or at least a portion thereof) in an upward direction from the perspective of FIG. 1.

Figure 2A:
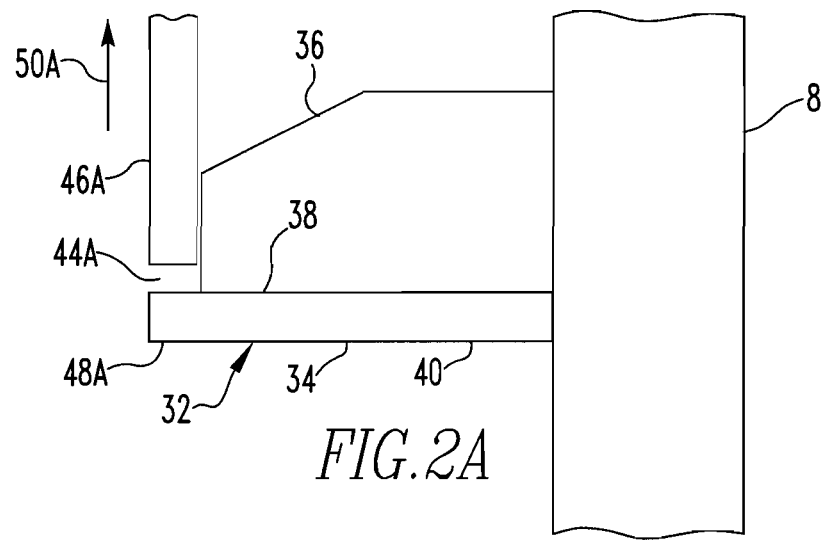
FIGS. 2A and 2B depict different fashions in which a cut can be formed in a shroud of the boiling water reactor assembly of FIG. 1.
Figure 2B:
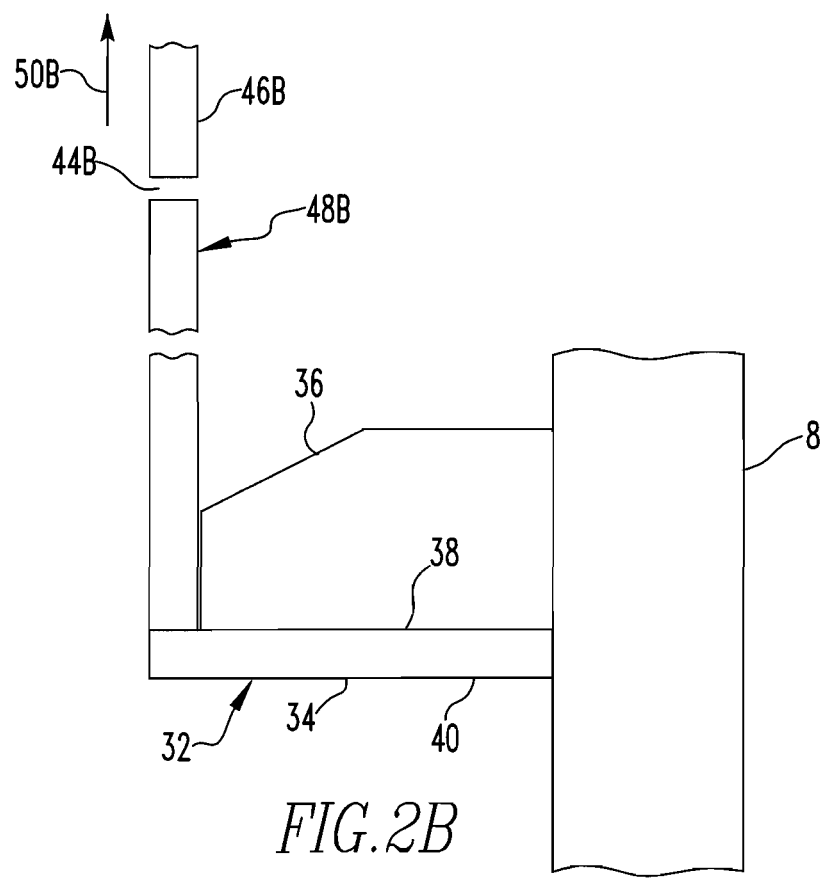

As can be understood from FIG. 1 and from the enlarged portion thereof depicted in FIGS. 2A and 2B, the support 32 includes a support plate 34 that is of a generally annular shape and that extends in a circumferential fashion about a central axis 42 of the reactor pressure vessel 8. The support plate 34 has a first surface 38 that faces in a generally upward direction from the perspective of FIG. 1 and a second surface 40 that faces in a generally downward direction from the perspective of FIG. 1. The first and second surfaces 38 and 40 are of a generally planar configuration and face in opposite directions generally away from one another.

FIGS. 2A and 2B further depict the support 32 as including a plurality of support gussets 36 that are affixed to the support plate 34 at the first surface 38 thereof. The support gussets 36 are depicted only in FIGS. 2A and 2B and are not expressly depicted in FIG. 1 since they are an optional feature that is not found in all implementations of the generically-depicted boiling water reactor assembly 4. As can be understood from FIGS. 2A and 2B, the support gussets 36, to the extent that they are found in any given implementation of the boiling water reactor assembly 4, are affixed to both the pressure reactor vessel 8 at its inner cylindrical surface and also to the support plate 34 at the first surface 38 thereof. The support gussets 36 provide vertical support from the perspective of FIG. 1 to the support plate 34 and thus to the shroud 28. In certain embodiments, the support gussets 36 may also be affixed to the shroud 28, although this is likewise not necessarily the case in all implementations of the boiling water reactor assembly 4.

Once structures such as the top guide, the core plate, and the fuel assemblies 20 with their fuel rods have been removed from the boiling water reactor assembly 4, the shroud 28 can be removed. In particular, the shroud 28 may be removed in whole or in part depending upon the extent of cracking in the welds thereof, and based upon other considerations. An instance of a complete removal of the shroud 28 from the boiling water reactor assembly 4 is depicted generally in FIG. 2A, whereas an instance of a partial removal of the shroud 28 from the boiling water reactor assembly 4 is depicted generally in FIG. 2B. As will be understood, a complete removal of the shroud 28 will require as a replacement a new complete shroud whereas removal of only a portion of the shroud 28 will require only a partial replacement of the shroud.

As can be understood from FIG. 2A, the entire shroud 28 is removed from the shroud apparatus 12 by first forming a cut 44A through the shroud 28 to detach it from what can be referred to as a "remaining portion" of the shroud apparatus 12. Since the cut 44A separates the shroud 28 in its entirety from the support 32, the entire shroud 28 can be said to constitute a cut portion 46A and can be said to be removable from a remaining portion 48A which is in the form of the entirety of the support 32. Once the shroud 28 has been separated via the cut 44 from the support 32, meaning that the cut has been made to separate the shroud 28 from the support plate 34 and the support gussets 36, as appropriate, the cut portion 46A is removed from the remaining portion 48A, as is indicated with the arrow 50A.

Alternatively, and as is indicated generally in FIG. 2B, a portion of the shroud 28 can constitute a cut portion 46B by forming a cut 44B through the shroud 28 at some location thereon spaced vertically (from the perspective of FIG. 1) from the support plate 34. This results in a remaining portion 48B of the shroud apparatus 12 that includes the support 32 and a portion of the shroud 28 that remains affixed to the first surface 38 thereof. The cut portion 46B can then be removed from the remaining portion 48B as is indicated generally with the arrow 50B. The forming of cuts 44A and 44B can occur via any appropriate machining methodology, such as with the use of a cutting wheel, a torch, and the like.

Such cutting operations, as well as many of the other operations set forth herein, will typically be performed remotely or robotically. Moreover, it is noted that the coolant need not necessarily be removed from the interior of the reactor pressure vessel 8 during the cutting operations set forth above or the retrofitting operations that will be set forth below due to the use of remote or robotic equipment to perform many of the tasks. This advantageously simplifies all of the operations set forth herein and advantageously results in less cost and less downtime for the boiling water reactor assembly 4.

Numerous types of replacement shroud systems can be employed to retrofit the boiling water reactor assembly 4 to replace its cracked shroud 28 that is welded to other structures therein with replacement equipment that is mounted with removable fastening devices. Five embodiments of such replacement shroud systems are explicitly set forth herein. It is understood, however, that numerous other types of replacement shroud systems other than those expressly depicted herein can be employed in such a retrofitting operation that will still be within the scope of the disclosed and claimed concept. Moreover, the various embodiments expressly depicted herein can have their various features combined in virtually any combination without departing from the scope of the present concept.

A replacement shroud system 52 is represented in FIGS. 3 and 4 as being installed on the support 32. For the sake of simplicity of disclosure, only portions of the replacement shroud system 52 are depicted in FIGS. 3 and 4. The replacement shroud system 52 can be said to include a replacement shroud element 54, a plurality of fastening devices 56, and a bracket apparatus 59. The replacement shroud element 54 itself includes a base ring 58 and a shroud body 62, it being noted that the shroud body 62 is not depicted in FIG. 4 for purposes of clarity of disclosure.

The bracket apparatus 59 includes a plurality of brackets or bracket elements 60 that are mounted to the base ring 58. Each bracket element 60 includes a base 64 that is mounted to the base ring 58 and a lug 66 that protrudes outwardly from the base 64. The lugs 66 can be said to be situated in a direction oriented generally radially with respect to the central axis 42 of the reactor pressure vessel 8. As can be understood from FIG. 3, each lug 66 has a lug hole 72 formed therein. When the replacement shroud system 52 is installed on the support 32, the lugs 66 are removably connected with the support gussets 36 through use of the fastening devices 56 which, in the embodiment depicted generally in FIGS. 3 and 4, are in the form of non-threaded pins. The pins are each received in one of the lug holes 72 and are each further received in a gusset hole 74 that is correspondingly positioned formed in a corresponding one of the support gussets 36. As part of the retrofitting operation, therefore, it is necessary to form a gusset hole 74 in each support gusset 36 in an orientation that will enable it to be aligned with a corresponding lug hole 72 on a lug 66 and to accommodate a fastening device 56 therein.

The fastening devices 56, i.e., the pins, are received in lug holes 72 and gusset holes 74 that correspond with one another and may have a nominal interference fit therewith in order to retain the fastening devices 56 in such position during subsequent operation of the retrofitted boiling water reactor assembly 4. Insertion of the fastening devices 56 in corresponding sets of lug and gusset holes 72 and 74 occurs by translating the fastening device 56 in a circumferential direction as is indicated generally with the arrow 76 in FIG. 4, which is a direction that is substantially perpendicular to both the central axis 42 and to a radial direction extending from the central axis 42.

In this regard, it is understood that the fastening devices 56 potentially can be removed from their locations positioned within corresponding sets of lug and gusset holes 72 and 74 if it is necessary at a subsequent time to replace the replacement shroud system 52 with a further replacement shroud system. That is, the fastening devices 56 are configured to removably fasten the replacement shroud element 54 to the support 32. It is noted, however, that the replacement shroud system 52 is further configured to enable an alternative subsequent replacement of the replacement shroud system 52.

More specifically, and as can be seen in FIG. 3, the bracket elements 60 are affixed to the base ring 58 with the use of a set of removable fasteners 68 that extend through holes formed in the base 64 and through corresponding holes formed in the base ring 58. It thus can be understood that the fasteners 68, which may be in the form of threaded fasteners such as bolts or other removable fasteners, could be removed to permit the base ring 58 to be removed from the bracket elements 60 and to permit a replacement base ring 58 to be retrofitted thereto at some point in the future, depending upon the needs of the given application.

As can be understood from FIG. 3, the shroud body 62 is affixed to an upper end of the base ring 58 and typically will be welded thereto. Alternatively, however, the shroud body 62 potentially can be connected with the base ring 58 through the use of removable fastening devices such as bolts, clamps, pins, and the like without limitation.

As should be apparent from the foregoing, the replacement shroud system 52 can be installed on the support 32 in any of a variety of fashions. For example, the shroud body 62 and the base ring 58 can be connected with one another, and the bracket elements 60 can be connected with the base ring 58, with the entire replacement shroud system 52 then being lowered into engagement with the support plate 34 and with the fastening devices 56 being received in corresponding pairs of lug and gusset holes 72 and 74. Alternatively, however, the operations can be performed in substantially any appropriate order. For example, the bracket elements 60 may be attached to the base ring 58, and the base ring 58 may then be lowered into engagement with the support plate 34. The positioning of the lug holes 72 can be employed to determine the positions of the gusset holes 74 that must be formed in the support gussets 36, with such gusset holes 74 thereafter being formed in the support gussets 36 at appropriate locations. The fastening devices 56 can then be received in the correspondingly positioned pairs of lug and gusset holes 72 and 74. The shroud body 62 can then be lowered into position on the base ring 58 and can be attached thereto, such as through removable connectors, through welding, and the like. Other installations methodologies will be apparent.

As mentioned above, the fastening devices 56 and the threaded fasteners 68 can each be employed as removable fastening devices that enable the replacement shroud system 52 to be subsequently replaced if the need arises, such as due to cracking and the like propagating in welds, or if other failure modes present themselves. It thus should be understood that future replacements of the replacement shroud system 52 can be performed with relative ease compared with the initial retrofitting mentioned above to install the replacement shroud system 52, and also with far less effort than would be required to replace the shroud 28 with another welded shroud similar thereto.

It is to be understood that the replacement shroud system 52 can be of other configurations than expressly depicted herein. For example, the replacement shroud element 54 can be formed as a unitary, i.e., single piece, element wherein the base ring 58 and the shroud body 62 are not separate components but rather are formed as unitary whole. By way of further example, the bracket apparatus 59 can be configured such that only a subset of the support gussets 36 are used for mounting the replacement shroud system 52. As can be understood from FIG. 4, the support gussets 36 can be said to generally alternate with the jet pumps 24, and depending upon the configuration of the replacement shroud system 52 and the resultant retrofitted boiling water reactor assembly 4, it may be unnecessary to connect the replacement shroud system 52 with each of the support gussets 36. In such an exemplary scenario, only one-half or one-third of the support gussets 36 may be connected with bracket elements 60, for instance.

Figure 5:
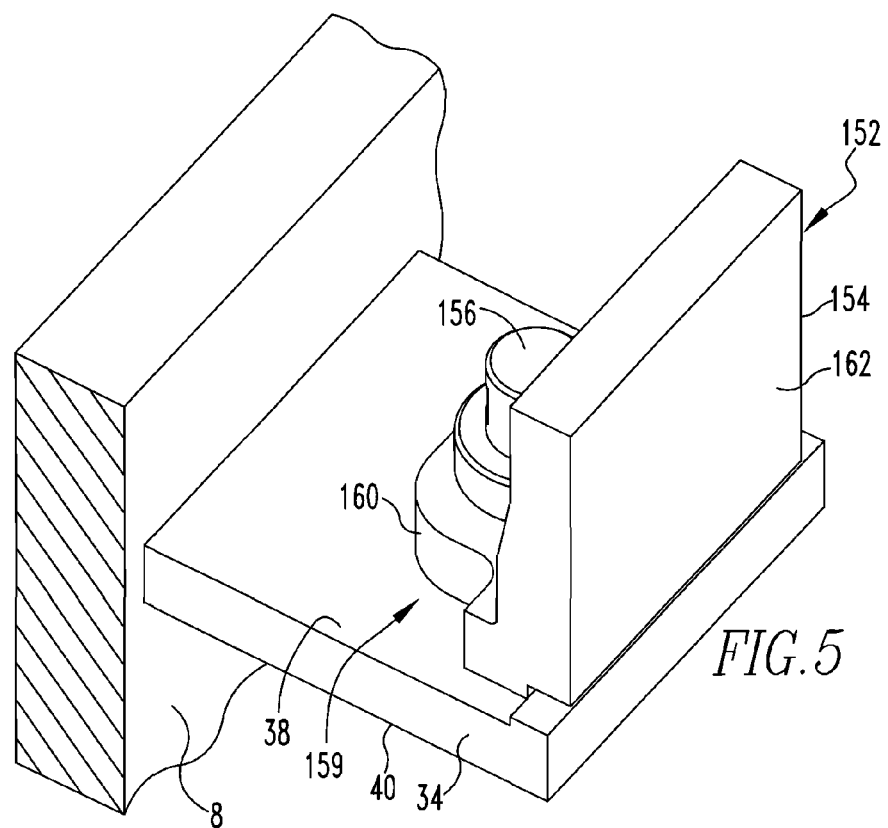
FIGS. 5 and 6 depict an improved replacement shroud system in accordance with a second embodiment of the disclosed and claimed concept installed on a remaining portion of a shroud apparatus of the boiling water reactor assembly of FIG. 1.
Figure 6:
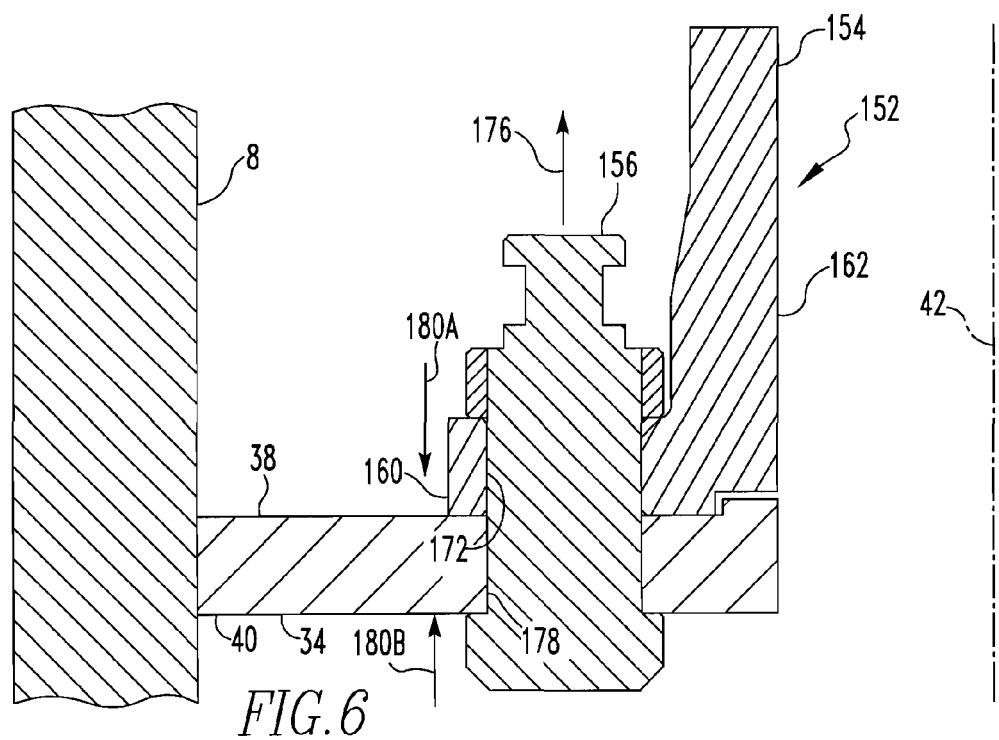

A replacement shroud system 152 in accordance with a second embodiment of the disclosed and claimed concept is depicted generally in FIGS. 5 and 6. Replacement shroud system 152 includes a replacement shroud element 154 and a plurality of fastening devices 156 that are in the exemplary form of threaded fasteners. Replacement shroud system 152 further can be said to include a bracket apparatus 159 having a plurality of bracket elements 160 that are oriented in a generally radial direction with respect to the central axis 42. The replacement shroud element 152 includes a shroud body 162, and the bracket elements 160 are situated on the shroud body 162 and extend away from the shroud body 162 in a direction that is likewise generally away from the central axis 42.

Each bracket element 160 has a bracket hole 172 formed therein that is sized to receive therein one of the fastening devices 156. In order to install the replacement shroud system 152, a plurality of support holes 178 that are positioned to correspond with the bracket holes 172 are formed in the support plate 34. Depending upon the particular application, the replacement shroud system 152 may need to be lowered downward (from the perspective of FIG. 1) and into place on the support plate 34 in order to determine the specific positions where the support holes 178 will be formed in the support plate 34.

The fastening devices 156 are then received in correspondingly positioned pairs of bracket and support holes 172 and 178 with such installation occurring by translating a bolt portion of each fastening device 156 in a direction indicated generally by the arrow 176, which is a direction that is oriented generally parallel with the central axis 42. The nut portions of the fastening devices 156 are then threadably cooperated with the bolt portions thereof in order to apply compressive forces as indicated at the numerals 180A and 180B to the bracket elements 160 and the support plate 34.

The fastening devices 156 are subsequently removable from the replacement shroud system 152 in order to permit the replacement shroud system 152 to be replaced at a future time with another replacement shroud system, if necessary. The compressive forces 180A and 180B applied by the fastening devices 156 have the effect of forming a seal between the replacement shroud system 152 and the support 32 in order to promote heat transfer to the coolant and steam generation while resisting the leakage of heated coolant to locations situated outside the replacement shroud system 152. Moreover, the fastening devices 156 resist movement of the replacement shroud system 152 in directions perpendicular to the central axis 42, i.e., in directions in a horizontal plane with respect to FIG. 1.

Figure 7:
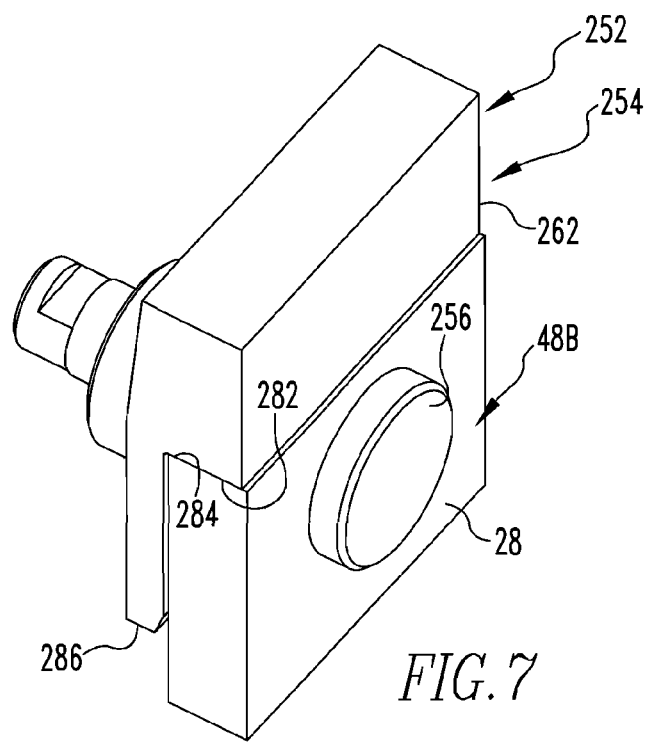
FIGS. 7 and 8 depict an improved replacement shroud system in accordance with a third embodiment of the disclosed and claimed concept installed on a remaining portion of a shroud apparatus of the boiling water reactor assembly of FIG. 1.
Figure 8:
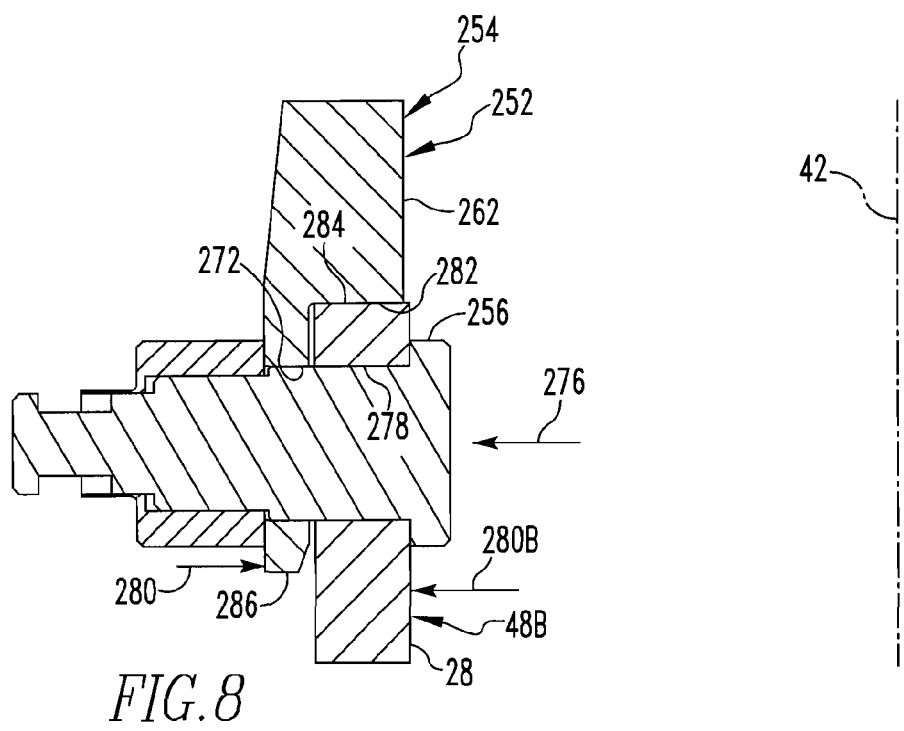

A replacement shroud system 252 in accordance with a third embodiment of the disclosed and claimed concept is depicted generally in FIGS. 7 and 8. The replacement shroud system 252 includes a replacement shroud element 254 and a plurality of fastening devices 256 which, in the exemplary embodiment depicted herein, are in the form of threaded fasteners.

The replacement shroud element 254 includes a hollow and generally cylindrical shroud body 262 that is configured at its lower end (from the perspective of FIG. 1) to have a generally annular ledge 282 foamed thereon and a protrusion 286 that is of a generally annular shape and which protrudes from the shroud body 262 at a direction generally away from the ledge 282. The protrusion 286 has a plurality of shroud holes 272 formed therein. As such, a plurality of support holes 278 must be formed in the remaining portion 48B of the original shroud 28 that are correspondingly positioned, i.e., oriented with, corresponding shroud holes 272.

More specifically, the replacement shroud system 252 is positioned on the remaining portion 48B such that the ledge 282 engages an annular cut surface 284 that has been machined on the remaining portion 48B and which supports the shroud body 262 thereon. The shroud holes 272 can be employed, if necessary, to determine the locations where the support holes 278 will need to be formed in the remaining portion 48B of the original shroud 28. Alternatively, the support holes 278 may be formed without needing to pre-install the replacement shroud system 252 on the cut surface 284.

The fastening devices 256 are then received in correspondingly positioned pairs of shroud and support holes 272 and 278 by translating a bolt portion of each fastening device 256 in a generally radial direction with respect to the central axis 42, as is indicated generally at the arrow 276. The nut portion of each fastening device 256 is then tightened onto to the bolt portion thereof in order to generate compressive forces as are indicated at the numerals 280A and 280B between the protrusion 286 of the shroud body 262 and the remaining portion 48B of the original shroud 28. Such compressive forces 280A and 280B tend to form a seal between the shroud body 262 and the remaining portion 48B and additionally resist movement of the shroud body 262 in a vertical direction from the perspective of FIG. 1.

Figure 9:
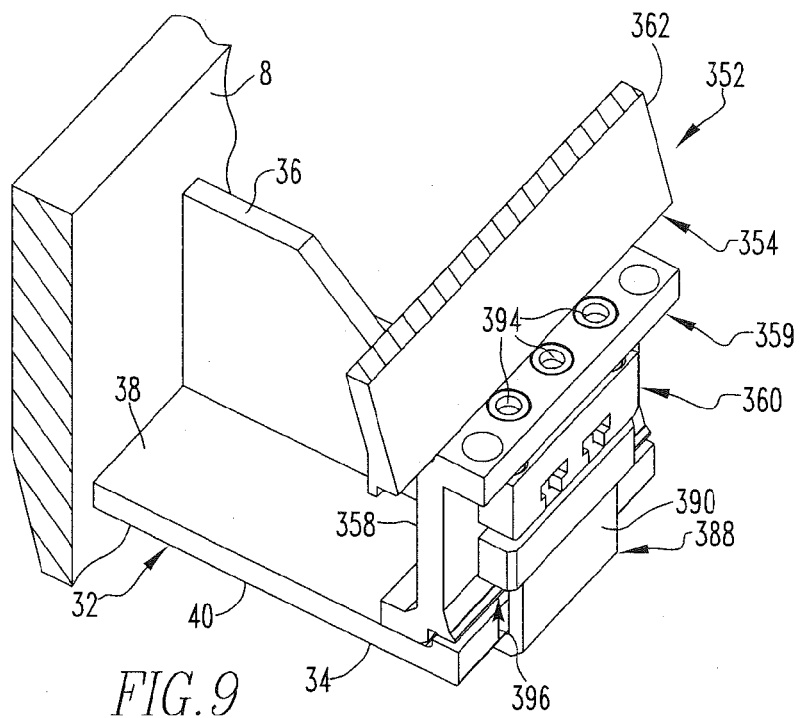
FIGS. 9 and 10 depict an improved replacement shroud system in accordance with a fourth embodiment of the disclosed and claimed concept installed on a remaining portion of a shroud apparatus of the boiling water reactor assembly of FIG. 1.
Figure 10:
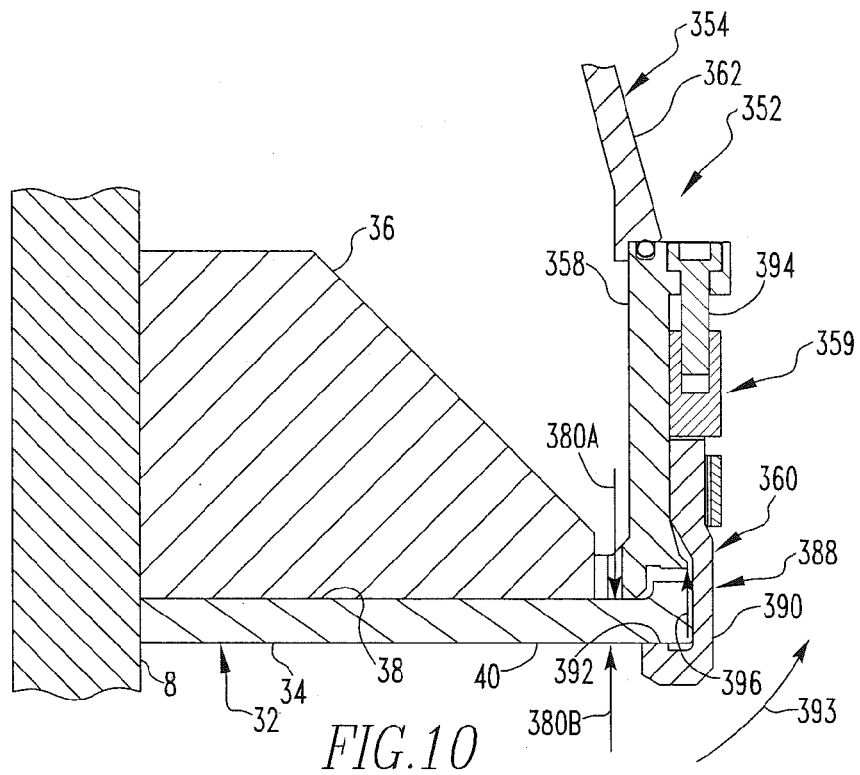

A replacement shroud system 352 in accordance with a fourth embodiment of the disclosed and claimed concept is depicted generally in FIGS. 9 and 10. The replacement shroud system 352 can be said to include a replacement shroud element 354 and a bracket apparatus 359 that comprises a plurality of brackets 360, one of which is depicted in FIGS. 9 and 10. The brackets 360 serve as fastening devices which enable replacement shroud system 352 to be removably fastened to support 32.

The replacement shroud element 354 can be said to include a base ring 358 and a shroud body 362. The brackets 360 are mounted on the base ring 358, and the shroud body 362 is affixed to the base ring 358.

The brackets 360 each include a latch 388 and a number of tensioning elements 394 which are in the exemplary form of a plurality of threaded elements. As employed herein, the expression "a number of" and variations thereof shall refer broadly to any non-zero quantity, including a quantity of one. The latches 388 are themselves pivotably mounted on the base ring 358 as is indicated generally at the arrow 393 in FIG. 10. Such pivoting movement of the latches 388 enables the latches to be pivoted out of the way of support plate 34 during installation of replacement shroud system 352 on support plate 34 and then allows them to be pivoted in a direction opposite the arrow 393 to enable the latches 388 to engage the second surface 40 of the support plate 34.

More particularly, each latch 388 includes an elongated shank 390 and an engagement element 392. Rotation of the tensioning elements 394 applies a tensile force, as is indicated at the numeral 396, on the shank 390 which, in turn, causes engagement element 392 to compressively engage the second surface 40 of the support plate 34 with compressive forces as indicated generally at the numerals 380A and 380B. Such compressive forces 380A and 380B retain the replacement shroud system 352 installed on the support plate 34 and resist movement thereof in the vertical and horizontal directions with respect to FIG. 1.

The exemplary tensioning elements 394 are depicted herein as being threaded elements, but it is understood that virtually any other type of tensioning apparatus can be employed. For instance, latching devices, eccentric devices, and the like can be employed without limitation to apply the tensile force 396 to the shank 390.

In one exemplary installation methodology, the base ring 358 is received on the first surface 380 of the support plate 34, and the latches 388 are compressively engaged with the second surface 40 of the support plate 340 to removably mount the base ring 358 to the support plate 340. The shroud body 362 can then be affixed to the base ring 358, such as by welding or through the use of removable connection elements. Alternatively, the base ring 358 and the shroud body 362 can be connected together prior to installation of the replacement shroud system 352. In such a scenario, the replacement shroud element 354 would be lowered as a whole into the interior of the reactor pressure vessel 8 until the base ring 358 engages the support plate 34. The brackets 360 would then be attached to the support plate 34. Other installation methodologies will be apparent.

Figure 11:
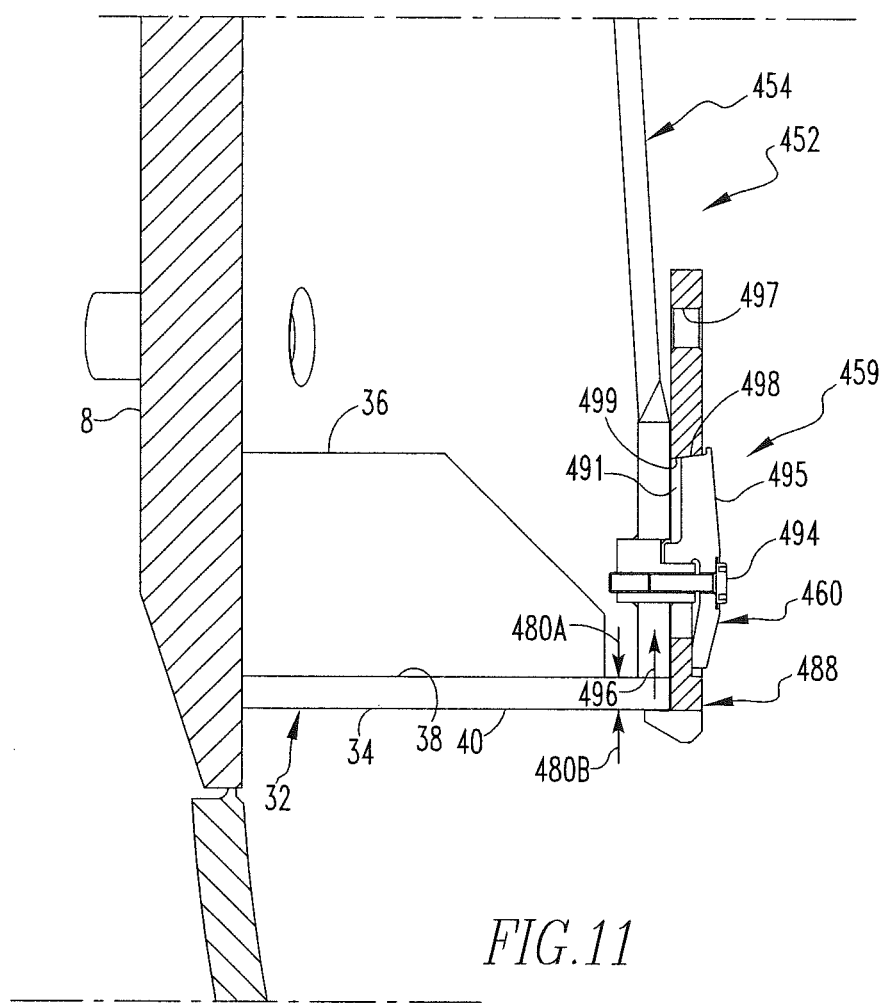
FIG. 11 depicts an improved replacement shroud system in accordance with a fifth embodiment of the disclosed and claimed concept installed on a remaining portion of a shroud apparatus of the boiling water reactor assembly of FIG. 1.

A replacement shroud system 452 in accordance with a fifth embodiment of the disclosed and claimed concept is depicted generally in FIG. 11. Replacement shroud system 452 is similar to replacement shroud system 352 in that it includes a replacement shroud element 454 to which is connected a bracket apparatus 459 that comprises a plurality of brackets 460, each of which functions in the fashion of a fastening device that enables the replacement shroud system 452 to be removably mounted on the support plate 34. Each bracket 460 includes a latch 488 that is pivotable with respect to the replacement shroud element 454 and which is engageable with the second surface 40 of the support plate 34 to apply compressive forces 480A and 480B between the support plate 34 and the replacement shroud element 454. However, the brackets 460 include a number of tensioning elements 494 that function in a different fashion than the tensioning elements 394.

The tensioning elements 494 are threaded elements which, when rotated, apply a compressive force and translate a wedge element 495 in a generally radial direction with respect to the central axis 42. The wedge element 495 is received in an opening 491 that is formed in the latch. The wedge element 495 has an angled surface 498, and the latch 488 at the opening 491 has a cooperatively configured angled surface 499. When the tensioning elements 494 are tightened, which causes the wedge element 495 to be translated in a radial direction away from the central axis 42 and toward the reactor pressure vessel 8, the angled surface 498 of the wedge element 495 slidingly engages the angled surface 499 of the latch 488, which causes the latch 488 to be translated in an upward direction from the perspective of FIG. 11. Such translation applies a tensile force 496 to the portions of the latch 488 that are disposed below (from the perspective of FIG. 11) the angled surface 499.

Depending upon the sizes of the angled surfaces 498 and 499 and their orientation with respect to the vertical direction (from the perspective of FIG. 11), the aforementioned tensioning of the tensioning elements 494 may enable only limited upward translation of the latch 488. In such a situation, it may be necessary to initially situate the replacement shroud system 452 on the support plate 34 with the wedge elements 495 removed from the openings 491 and with the latches 488 positioned in a vertically lower position than is depicted in FIG. 11. Once the replacement shroud system 452 is properly positioned on the support plate 34, a upward tensile force can be applied to the latches 488 at a hole 497 formed in each latch 488 to pull the latches 488 upward and to effectively pretension them against the second surface 40 of the support plate 34. The wedge elements 495 can then be received in the openings 491 and the tensioning elements 494 tensioned in order to generate the desired compressive forces 480A and 480B between the support plate 34 and the replacement shroud element 454.

Numerous methodologies can be employed for installing the replacement shroud systems 352 and 452, as with the replacement shroud systems 52, 152, and 252. Moreover, the replacement shroud systems 352 and 452 are readily replaceable in the future should the need arise, such as due to the propagation of cracks therein, as with the replacement shroud systems 52, 152, and 252.

It thus can be seen that numerous methodologies can be employed for replacing at least a portion of the shroud 28 of the boiling water reactor assembly 4 in order to form a retrofitted boiling water reactor assembly. While five different replacement shroud systems 52, 152, 252, 352, and 452 have been described herein, each with one or more installation methodologies described therewith, it is understood that variations of the structures and methodologies described herein can be employed without departing from the present concept. Moreover, it is understood that further variations will be apparent to one skilled in the art. The advantageous replacement of the welded shroud 28 with a replacement shroud system 52, 152, 252, 352, and 452, which is mechanically removably mounted to the support plate 34, enables future replacement of such replacement shroud systems 52, 152, 252, 352, and 452 to be performed with relative ease and minimal downtime and expense. Other advantages will be apparent to one of ordinary skill in the art.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of replacing at least a portion of a shroud apparatus that extends adjacent at least a portion of a nuclear reactor with a replacement shroud system, the replacement shroud system comprising a replacement shroud element and a bracket apparatus, the replacement shroud element comprising a base ring and a shroud body, the bracket apparatus comprising a plurality of brackets each having a latch and being mounted on the base ring, the shroud apparatus including a substantially cylindrical shroud and a substantially annular support upon which the shroud is disposed, the method comprising:

forming a cut in the shroud;
removing at least a portion of the shroud adjacent the cut from a remaining portion of the shroud apparatus;
receiving the base ring on a first surface of the support;
connecting the plurality of brackets between the base ring and the support by:
engaging a first portion of each latch with a second surface of the support opposite the first surface, and
applying a force to a second portion of each latch to apply compression between the base ring and the support;
affixing the shroud body to the base ring subsequent to the receiving; and
wherein the plurality of brackets each further comprise a threaded tensioning element and a wedge element, and wherein each latch has an angled surface, and further comprising:

rotating each tensioning element and thereby translating each wedge element to slidingly engage the wedge element with the angled surface to apply the compression between the base ring and the support.

2. The method of claim 1, further comprising connecting as the plurality of fastening devices a plurality of removable fastening devices.

* * * * *